(12) United States Patent
Matsuda

(10) Patent No.: US 11,705,969 B2
(45) Date of Patent: Jul. 18, 2023

(54) RECEIVER

(71) Applicant: Mitsubishi Electric Corporation, Tokyo (JP)

(72) Inventor: Keisuke Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/569,690

(22) Filed: Jan. 6, 2022

(65) Prior Publication Data

US 2022/0131620 A1    Apr. 28, 2022

Related U.S. Application Data

(63) Continuation of application No. PCT/JP2019/033212, filed on Aug. 26, 2019.

(51) Int. Cl.
   *H04B 10/00*    (2013.01)
   *H04B 10/61*    (2013.01)
   *H04B 10/114*   (2013.01)

(52) U.S. Cl.
   CPC ..... *H04B 10/6165* (2013.01); *H04B 10/1143* (2013.01)

(58) Field of Classification Search
   CPC ............ H04B 10/6165; H04B 10/1143; H04B 10/1149; H04B 10/1123; H04B 10/1125; H04B 10/616; H04B 10/6164; H04B 10/6163; H04B 10/40; H04B 10/2507;
   (Continued)

(56) References Cited

U.S. PATENT DOCUMENTS

| 6,018,755 A | 1/2000 | Gonikberg et al. |
| 8,989,602 B2 * | 3/2015 | Komaki ............ H04L 25/03019 |
| | | 398/208 |
| 9,722,698 B2 | 8/2017 | Dahan et al. |

(Continued)

FOREIGN PATENT DOCUMENTS

| JP | 2002-9676 A | 1/2002 |
| JP | 2002-150686 A | 5/2002 |

(Continued)

OTHER PUBLICATIONS

Leven et al., "Frequency Estimation in Intradyne Reception," IEEE Photonics Technology Letters, vol. 19, No. 6, Mar. 15, 2007, pp. 366-368.

Oerder et al.,"Digital Filter and Square Timing Recovery," IEEE Transactions on Communications, vol. 36, No. 5, May 1988, pp. 605-612.

(Continued)

*Primary Examiner* — Hanh Phan

(74) *Attorney, Agent, or Firm* — Birch, Stewart, Kolasch & Birch, LLP

(57) ABSTRACT

A receiver is configured to extract a clock signal superimposed on a detection signal of light propagated to determine whether or not SNR of the detection signal is lower than SNR at which the detection signal can be demodulated; compensate a signal value of the detection signal by using a filter coefficient and output a detection signal after signal value compensation; and calculate, as the filter coefficient, a filter coefficient in which a signal value of a detection signal output from the adaptive filter is a reference value when it is determined that there is no SNR degradation, and changes the filter coefficient to a stored filter coefficient when it is determined that SNR degradation occurs.

14 Claims, 9 Drawing Sheets

(58) Field of Classification Search
CPC .. H04B 10/6971; H04B 10/695; H04L 7/0075
USPC ....... 398/118, 119, 120, 121, 122, 123, 124,
398/127, 128, 129, 130, 131, 135, 136,
398/202, 208, 209, 158, 159, 126, 125,
398/154, 155; 375/232, 233, 229, 316
See application file for complete search history.

(56) References Cited

U.S. PATENT DOCUMENTS

| | | | | |
|---|---|---|---|---|
| 2009/0116844 | A1* | 5/2009 | Tanaka | H04B 10/677 398/115 |
| 2015/0147071 | A1* | 5/2015 | Kawasoe | H04B 10/6165 398/202 |
| 2018/0198547 | A1 | 7/2018 | Mehrvar et al. | |

FOREIGN PATENT DOCUMENTS

| | | |
|---|---|---|
| JP | 2005-303786 A | 10/2005 |
| JP | 4290597 B2 | 7/2009 |

OTHER PUBLICATIONS

Viterbi et al., "Nonlinear Estimation of PSK-Modulated Carrier Phase with Application to Burst Digital Transmission," IEEE Transactions on Information Theory, vol. IT-29, No. 4, Jul. 1933, pp. 543-551.
Extended European Search Report for European Application No. 19942892.1, dated Jul. 15, 2022.
Office Action dated Mar. 27, 2023 issued in corresponding European Patent Application No. 19 942 892.1.

* cited by examiner

FIG. 9

| Power of Light | Power of Digital Detection Signal | Amplitude of Clock Signal | Determination Result |
|---|---|---|---|
| High | High | Low | Modulation Abnormality |
| High | Low | Low | Wavelength Deviation |
| Low | High | Low | Power of Light Degrades |
| High | High | High | Normal |

RECEIVER

CROSS REFERENCE TO RELATED APPLICATIONS

This application is a Continuation of PCT International Application No. PCT/JP2019/033212, filed on Aug. 26, 2019, which is hereby expressly incorporated by reference into the present application.

TECHNICAL FIELD

The present invention relates to a receiver that compensates a detection signal of light propagated through space.

BACKGROUND ART

As a receiver that receives light propagated through space, there is a receiver including an optical system that collects the light propagated through the space and couples the collected light to an optical fiber and an optical amplifier that amplifies the light transmitted by the optical fiber.

Since the wavefront of the light propagated through the space is distorted due to the influence of the atmosphere, when the light is coupled to the optical fiber by the optical system, the power of the light may be lost. With the loss of light, a signal-to-noise ratio (SNR) of an output signal of the optical amplifier degrades.

Since the loss of light changes with the lapse of time, the SNR of the output signal of the optical amplifier also changes with the lapse of time. When the SNR of the output signal of the optical amplifier degrades, the receiver cannot demodulate light, and the bit error rate may increase.

Patent Literature 1 below discloses a waveform equalizer that improves a bit error rate.

The waveform equalizer disclosed in Patent Literature 1 is used in a transmission path in which an impulse noise having a large amplitude is generated, and improves a bit error rate of an input signal by equalizing the waveform of the signal. If the waveform equalizer continues a function of equalizing the waveform of the signal (hereinafter, referred to as a "waveform equalization function") when the impulse noise is input, the waveform equalization function may diverge. Thus, the waveform equalizer stops the waveform equalization function.

That is, the waveform equalizer monitors the error amount of the waveform equalizer, and when detecting that the error amount exceeds the upper limit threshold, stops the waveform equalization function.

CITATION LIST

Patent Literature

Patent Literature 1: JP 2005-303786A

SUMMARY OF INVENTION

Technical Problem

Since the impulse noise is a noise having a large amplitude, when the impulse noise is input to the waveform equalizer disclosed in Patent Literature 1, an error amount of the waveform equalizer greatly changes. Thus, monitoring the error amount of the waveform equalizer makes it possible to detect the input of the impulse noise.

However, when the SNR decreases without great change of the signal amplitude, the error amount of the waveform equalizer does not greatly increase. For this reason, even if the error amount of the waveform equalizer is monitored, it is difficult to detect a degradation in the SNR. Thus, even when SNR degradation occurs so low that it is difficult to demodulate light, the waveform equalization function cannot be stopped, and thus the tap coefficient of the waveform equalizer may be updated to an inappropriate value. Once the tap coefficient of the waveform equalizer is updated to an inappropriate value, even if the degradation in SNR is resolved, the bit error rate cannot be improved unless the update processing of the tap coefficient of the waveform equalizer is repeated a plurality of times. That is, there is a problem that it takes a lot of time until the bit error rate can be improved even if the degradation in SNR is resolved.

The present invention has been made to solve the above problems, and an object of the present invention is to obtain a receiver capable of improving a bit error rate without performing a process of newly calculating a filter coefficient used by an adaptive filter and updating the filter coefficient used by the adaptive filter when a signal-to-noise ratio of a detection signal changes from less than a signal-to-noise ratio at which the detection signal can be demodulated to equal to or more than a signal-to-noise ratio at which the detection signal can be demodulated.

Solution to Problem

A receiver according to the present invention includes: processing circuitry configured to extract a clock signal superimposed on a detection signal of light propagated through space; determine whether or not a signal-to-noise ratio of the detection signal is lower than a signal-to-noise ratio at which the detection signal can be demodulated on the basis of an amplitude of the extracted clock signal, an adaptive filter to compensate a signal value of the detection signal by using a filter coefficient and output a detection signal after signal value compensation; calculate, as the filter coefficient, a filter coefficient in which a signal value of a detection signal output from the adaptive filter is a reference value; and store the calculated filter coefficient when the processing circuitry determines that the signal-to-noise ratio does not degrade, and change the filter coefficient used by the adaptive filter to a stored filter coefficient when the processing circuitry determines that the signal-to-noise ratio degrades.

Advantageous Effects of Invention

According to the present invention, the receiver is configured so that the coefficient update unit stores the filter coefficient calculated by the coefficient calculating unit when the degradation determination unit determines no degradation, and changes the filter coefficient used by the adaptive filter to a stored filter coefficient when the degradation determination unit determines degradation. Therefore, the receiver according to the present invention can improve a bit error rate without performing a process of newly calculating the filter coefficient used by the adaptive filter and updating the filter coefficient used by the adaptive filter when the signal-to-noise ratio of the detection signal changes from less than the signal-to-noise ratio at which the detection signal can be demodulated to equal to or more than the signal-to-noise ratio at which the detection signal can be demodulated.

BRIEF DESCRIPTION OF DRAWINGS

FIG. 4 is a hardware configuration diagram of a computer when the reception processing unit 6 is implemented by software, firmware, or the like.

FIG. 9 is an explanatory diagram illustrating an example of a determination result of the abnormality determination unit 61.

DESCRIPTION OF EMBODIMENTS

In order to explain this invention in more detail, a mode for carrying out this invention will be described below with reference to the accompanying drawings.

First Embodiment

Figure 1:
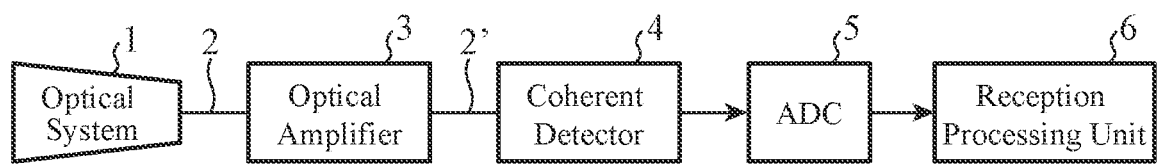
FIG. 1 is a configuration diagram illustrating a receiver according to a first embodiment.

FIG. 1 is a configuration diagram illustrating a receiver according to a first embodiment.

The receiver illustrated in FIG. 1 includes an optical system 1, optical fibers 2 and 2', an optical amplifier 3, a coherent detector 4, an analog-to-digital converter (hereinafter referred to as "ADC") 5, and a reception processing unit 6.

The optical system 1 collects light propagated through space and couples the collected light to the optical fiber 2. The light propagated through the space is light transmitted from a transmitter (not illustrated), and the baseband signal of the light transmitted from the transmitter is modulated by, for example, a modulation system of quadrature phase shift keying (QPSK) or 8PSK.

The optical fiber 2 transmits the light collected by the optical system 1 to the optical amplifier 3.

The optical amplifier 3 amplifies the light so that the power of the light transmitted by the optical fiber 2 turns into a predetermined power.

The optical amplifier 3 outputs the amplified light to the coherent detector 4 via the optical fiber 2'.

The optical fiber 2' connects the optical amplifier 3 and the coherent detector 4, and transmits the light output from the optical amplifier 3 to the coherent detector 4.

The coherent detector 4 coherently detects the amplified light output from the optical amplifier 3 and outputs a detection signal of the light to the ADC 5 as a coherent detection result of the light. The detection signal is an electrical signal.

Note that the coherent detector 4 performs coherent detection by making the amplified light output from the optical amplifier 3 and light having the same frequency interfere with each other. The frequency of the detection signal of light that is the coherent detection result is ideally in agreement with the frequency of the baseband signal. However, in reality, since the frequency of the amplified light output from the optical amplifier 3 may be slightly different from the frequency of the light to be interfered with, a deviation may occur between the frequency of the detection signal of the light and the frequency of the baseband signal.

In the receiver illustrated in FIG. 1, in order to eliminate the above deviation, a frequency compensation unit 21 described later compensates the frequency of a digital detection signal output from an adaptive filter 14 described later.

The ADC 5 converts the detection signal output from the coherent detector 4 from an analog signal to a digital signal (hereinafter, referred to as a "digital detection signal").

The ADC 5 outputs the digital detection signal to the reception processing unit 6.

The reception processing unit 6 compensates the digital detection signal output from the ADC 5 and demodulates the compensated digital detection signal.

Figure 2:
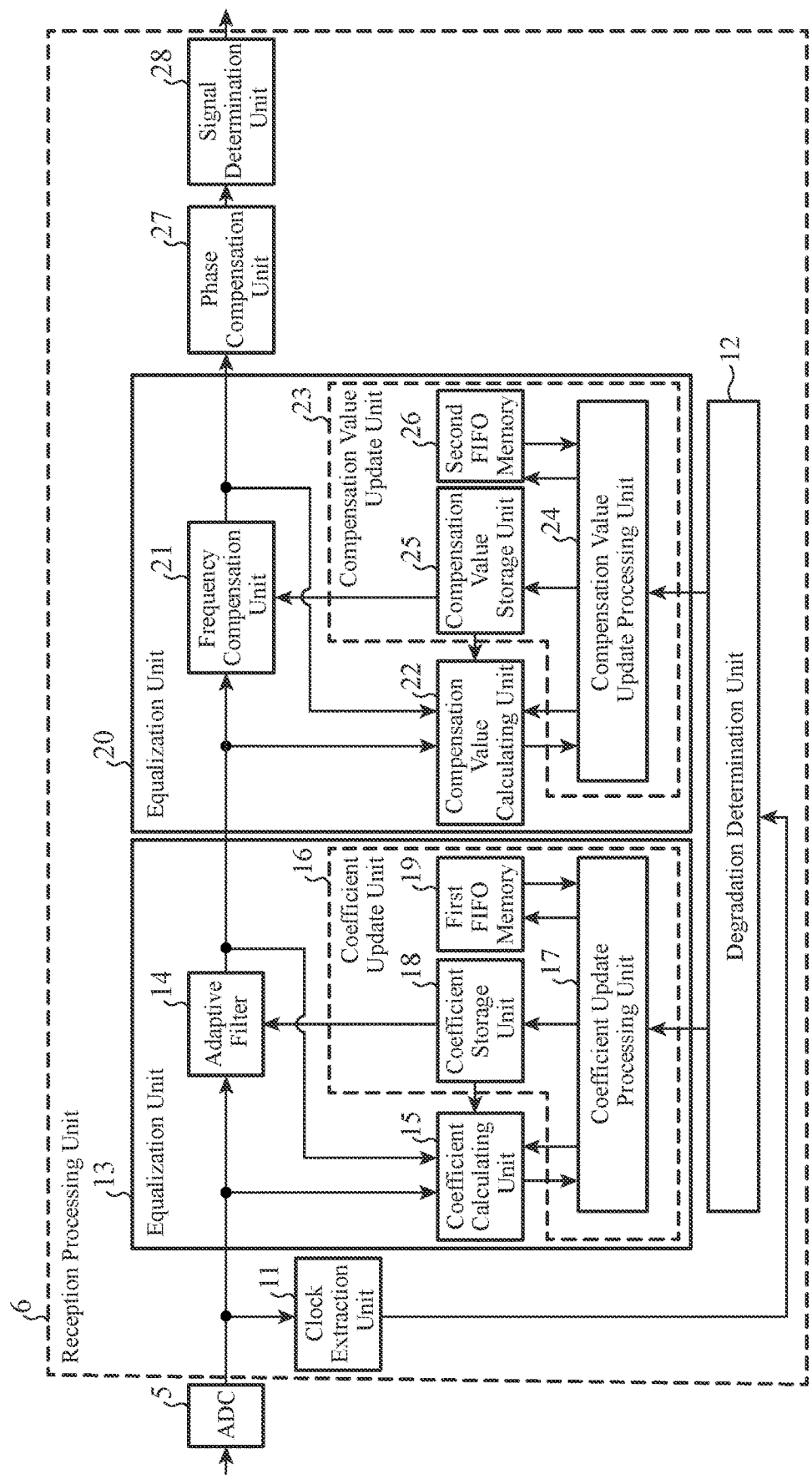
FIG. 2 is a configuration diagram illustrating a reception processing unit 6 of the receiver according to the first embodiment.

FIG. 2 is a configuration diagram illustrating the reception processing unit 6 of the receiver according to the first embodiment.

Figure 3:
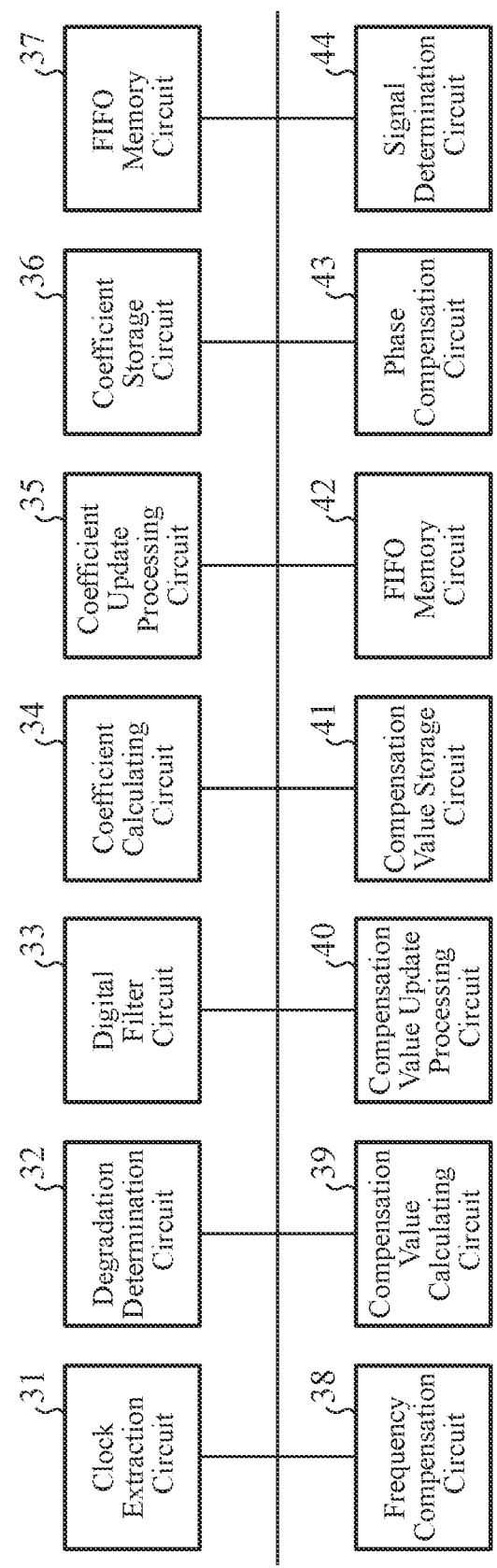
FIG. 3 is a hardware configuration diagram illustrating hardware of the reception processing unit 6 of the receiver according to the first embodiment.

FIG. 3 is a hardware configuration diagram illustrating hardware of the reception processing unit 6 of the receiver according to the first embodiment.

In FIG. 2, a clock extraction unit 11 is implemented by, for example, a clock extraction circuit 31 illustrated in FIG. 3.

The clock extraction unit 11 extracts a clock signal superimposed on the digital detection signal output from the ADC 5. The clock signal can be extracted from the digital detection signal by using, for example, a technique called "clock data recovery (CDR)" described in Non-Patent Literature 1 below.

[Non-Patent Literature 1]
M. Oerder and H. Meyr, "Digital filter and square timing recovery," in IEEE Transactions on Communications, vol. 36, no. 5, pp. 605-612, May 1988.

The clock extraction unit 11 outputs the extracted clock signal to a degradation determination unit 12 described later.

The degradation determination unit 12 is implemented by, for example, a degradation determination circuit 32 illustrated in FIG. 3.

On the basis of the amplitude of the clock signal extracted by the clock extraction unit 11, the degradation determination unit 12 determines whether or not the SNR (signal-to-noise ratio) of the digital detection signal output from the ADC 5 is lower than the SNR at which the digital detection signal can be demodulated (hereinafter referred to as the "demodulatable SNR").

That is, the degradation determination unit 12 compares the amplitude of the clock signal extracted by the clock extraction unit 11 with a threshold, and determines that the SNR of the digital detection signal is not lower than the demodulatable SNR when the amplitude of the clock signal is equal to or greater than the threshold.

When the amplitude of the clock signal is less than the threshold, the degradation determination unit 12 determines that the SNR of the digital detection signal is lower than the demodulatable SNR.

In the receiver illustrated in FIG. 1, when the amplitude of the clock signal is equal to or greater than the threshold, each of an equalization unit 13 and an equalization unit 20 described later can equalize the digital detection signal, and when the amplitude of the clock signal is less than the threshold, each of the equalization unit 13 and the equalization unit 20 may not be able to equalize the digital detection signal.

The threshold may be stored in the internal memory of the degradation determination unit 12 or may be given from the outside of the reception processing unit 6.

The degradation determination unit 12 outputs a determination result, indicating whether or not the SNR of the digital detection signal is lower than the demodulatable SNR, to each of a coefficient update processing unit 17 of a coefficient update unit 16 to be described later and a compensation value update processing unit 24 of a compensation value update unit 23 to be described later.

The equalization unit 13 includes an adaptive filter 14, a coefficient calculating unit 15, and a coefficient update unit 16.

The adaptive filter 14 is implemented by, for example, a digital filter circuit 33 illustrated in FIG. 3.

The adaptive filter 14 compensates a signal value of the digital detection signal output from the ADC 5 using a filter coefficient stored in a coefficient storage unit 18 described later.

The adaptive filter 14 outputs the digital detection signal after the signal value compensation to each of the coefficient calculating unit 15, and the frequency compensation unit 21 and a compensation value calculating unit 22 of the equalization unit 20 described later.

The coefficient calculating unit 15 is implemented by, for example, a coefficient calculating circuit 34 illustrated in FIG. 3.

The coefficient calculating unit 15 calculates, as a filter coefficient used by the adaptive filter 14, a filter coefficient in which a signal value of the detection signal output from the adaptive filter 14 is a reference value.

That is, the internal memory of the coefficient calculating unit 15 stores a reference value corresponding to the signal value of the digital detection signal output from the ADC 5.

The coefficient calculating unit 15 acquires a reference value corresponding to the signal value of the digital detection signal output from the ADC 5 from among the reference values stored in the internal memory, and acquires the filter coefficient stored in the coefficient storage unit 18.

The coefficient calculating unit 15 newly calculates a filter coefficient in which the signal value of the detection signal output from the adaptive filter 14 is the acquired reference value by using the filter coefficient stored in the coefficient storage unit 18.

The filter coefficient calculation processing itself by the coefficient calculating unit 15 is a known technique, and thus detailed description thereof will be omitted. Note that, in a case where the modulation system of light is, for example, QPSK, the filter coefficient can be calculated by executing a known constant modulus algorithm (CMA).

The filter coefficient calculated by the coefficient calculating unit 15 does not need to be a filter coefficient in which the signal value of the detection signal output from the adaptive filter 14 exactly matches the acquired reference value, and may be a filter coefficient in which the signal value of the detection signal output from the adaptive filter 14 is different from the acquired reference value as long as there is no practical problem.

The coefficient calculating unit 15 outputs the calculated filter coefficient to the coefficient update processing unit 17 of the coefficient update unit 16.

The signal value of the digital detection signal varies depending on the modulation system of light. When the signal value of the digital detection signal is modulated to be any value of 0, 1, 2, 3, 4, and 5, for example, the reference value is 0, 1, 2, 3, 4, and 5. A signal value of the digital detection signal output from the ADC 5 may deviate from the reference value due to a modulation abnormality of light in a transmitter (not illustrated), an influence of the atmosphere, or the like.

Hereinafter, a relationship between the signal value of the digital detection signal output from the ADC 5 and the reference value will be exemplified.

| Signal value of digital detection signal output from ADC 5 | Reference value |
|---|---|
| 0 to less than 0.5 | → 0 |
| 0.5 to less than 1.5 | → 1 |
| 1.5 to less than 2.5 | → 2 |
| 2.5 to less than 3.5 | → 3 |
| 3.5 to less than 4.5 | → 4 |
| 4.5 or above | → 5 |

The coefficient update unit 16 includes the coefficient update processing unit 17, the coefficient storage unit 18, and a first first-in first-out memory (hereinafter, referred to as a "first FIFO memory") 19.

When the degradation determination unit 12 determines that there is no SNR degradation, the coefficient update unit 16 stores the filter coefficient calculated by the coefficient calculating unit 15.

When the degradation determination unit 12 determines that there is no SNR degradation, the coefficient update unit 16 changes the filter coefficient used by the adaptive filter 14 to the filter coefficient calculated by the coefficient calculating unit 15.

When the degradation determination unit 12 determines that SNR degradation occurs, the coefficient update unit 16 changes the filter coefficient used by the adaptive filter 14 to the stored filter coefficient.

The coefficient update processing unit 17 is implemented by, for example, a coefficient update processing circuit 35 illustrated in FIG. 3.

When the degradation determination unit 12 determines that there is no SNR degradation, the coefficient update processing unit 17 causes the coefficient storage unit 18 to store the filter coefficient calculated by the coefficient calculating unit 15, thereby changing the filter coefficient used by the adaptive filter 14 to the filter coefficient calculated by the coefficient calculating unit 15.

When the degradation determination unit 12 determines that there is no SNR degradation, the coefficient update processing unit 17 causes the first FIFO memory 19 to store the filter coefficient calculated by the coefficient calculating unit 15.

When the degradation determination unit 12 determines that SNR degradation occurs, the coefficient update processing unit 17 stops the filter coefficient calculation processing in the coefficient calculating unit 15.

In addition, when the degradation determination unit 12 determines that SNR degradation occurs, the coefficient update processing unit 17 reads the filter coefficient stored earliest among the filter coefficients stored in the first FIFO memory 19.

The coefficient update processing unit 17 changes the filter coefficient used by the adaptive filter 14 to the readout filter coefficient by causing the coefficient storage unit 18 to store the readout filter coefficient.

The coefficient storage unit 18 is implemented by, for example, a coefficient storage circuit 36 illustrated in FIG. 3.

The coefficient storage unit 18 stores filter coefficients used by the adaptive filter 14.

The first FIFO memory 19 is implemented by, for example, a FIFO memory circuit 37 illustrated in FIG. 3.

The first FIFO memory 19 is a first-in first-out storage medium for storing the filter coefficients calculated by the coefficient calculating unit 15.

When the number of filter coefficients to be stored is D, and the first FIFO memory 19 receives the filter coefficient from the coefficient update processing unit 17, the first FIFO memory 19 stores the filter coefficient.

However, when the first FIFO memory 19 has already stored the D filter coefficients, upon receiving a filter coefficient from the coefficient update processing unit 17, the first FIFO memory 19 discards the filter coefficient stored earliest when storing the filter coefficient.

In the reception processing unit 6 illustrated in FIG. 2, a calculation cycle T of the filter coefficient in the coefficient calculating unit 15 is shorter than a required extraction time E of a clock signal in the clock extraction unit 11, and a value obtained by multiplying the number D of filter coefficients to be stored by the calculation cycle T is equal to or longer than the required extraction time E.

The equalization unit 20 includes a frequency compensation unit 21, a compensation value calculating unit 22, and a compensation value update unit 23.

The frequency compensation unit 21 is implemented by, for example, a frequency compensation circuit 38 shown in FIG. 3.

The frequency compensation unit 21 uses a frequency compensation value stored in a compensation value storage unit 25 described later to compensate the frequency of the digital detection signal output from the adaptive filter 14 by phase-rotating the digital detection signal output from the adaptive filter 14.

The frequency compensation unit 21 outputs the frequency-compensated digital detection signal to each of the compensation value calculating unit 22 and a phase compensation unit 27 described later.

The compensation value calculating unit 22 is implemented by, for example, a compensation value calculating circuit 39 illustrated in FIG. 3.

The compensation value calculating unit 22 calculates the frequency of the digital detection signal output from the adaptive filter 14 as the frequency compensation value used for the phase rotation of the digital detection signal by the frequency compensation unit 21

That is, the compensation value calculating unit 22 calculates a new frequency compensation value from the digital detection signal output from the adaptive filter 14, the frequency compensated digital detection signal output from the frequency compensation unit 21, and the frequency compensation value stored in the compensation value storage unit 25 as the frequency compensation value used for phase rotation of the digital detection signal by the frequency compensation unit 21.

The frequency compensation value calculation processing itself by the compensation value calculating unit 22 is a known technique, and for example, Non-Patent Literature 2 below discloses a calculation method of the frequency compensation value.

[Non-Patent Literature 2]
A. Leven, N. Kaneda, U. Koc and Y. Chen, "Frequency Estimation in Intradyne Reception," in IEEE Photonics Technology Letters, vol. 19, no. 6, pp. 366-368, Mar. 15, 2007.

The compensation value calculating unit 22 outputs the calculated frequency compensation value to the compensation value update processing unit 24 of the compensation value update unit 23.

The compensation value update unit 23 includes the compensation value update processing unit 24, the compensation value storage unit 25, and a second first-in first-out memory (hereinafter, referred to as a "second FIFO memory") 26.

When the degradation determination unit 12 determines that there is no SNR degradation, the compensation value update unit 23 stores the frequency compensation value calculated by the compensation value calculating unit 22.

In addition, when the degradation determination unit 12 determines that there is no SNR degradation, the frequency compensation unit 21 is caused to change the frequency compensation value used for phase rotation of the digital detection signal to the frequency compensation value calculated by the compensation value calculating unit 22.

When the degradation determination unit 12 determines that SNR degradation occurs, the compensation value update unit 23 causes the frequency compensation unit 21 to change the frequency compensation value used for phase rotation of the digital detection signal to the stored frequency compensation value.

The compensation value update processing unit 24 is implemented by, for example, a compensation value update processing circuit 40 illustrated in FIG. 3.

When the degradation determination unit 12 determines that there is no SNR degradation, the compensation value update processing unit 24 causes the compensation value storage unit 25 to store the frequency compensation value calculated by the compensation value calculating unit 22, thereby causing the frequency compensation unit 21 to change the frequency compensation value used for phase rotation of the digital detection signal to the frequency compensation value calculated by the compensation value calculating unit 22.

When the degradation determination unit 12 determines that there is no SNR degradation, the compensation value update processing unit 24 causes the second FIFO memory 26 to store the frequency compensation value calculated by the compensation value calculating unit 22.

When the degradation determination unit 12 determines that SNR degradation occurs, the compensation value update processing unit 24 stops the frequency compensation value calculation processing in the compensation value calculating unit 22.

When the degradation determination unit 12 determines that SNR degradation occurs, the compensation value update processing unit 24 reads the frequency compensation value stored earliest among the frequency compensation values stored in the second FIFO memory 26.

The compensation value update processing unit 24 causes the compensation value storage unit 25 to store the read frequency compensation value, thereby causing the frequency compensation unit 21 to change the frequency compensation value used for phase rotation of the digital detection signal to the read frequency compensation value.

The compensation value storage unit 25 is implemented by, for example, a compensation value storage circuit 41 illustrated in FIG. 3.

The compensation value storage unit 25 stores a frequency compensation value used for phase rotation of the digital detection signal by the frequency compensation unit 21.

The second FIFO memory 26 is implemented by, for example, a FIFO memory circuit 42 illustrated in FIG. 3.

The second FIFO memory 26 is a first-in first-out storage medium to store the frequency compensation value calculated by the compensation value calculating unit 22.

When the number of frequency compensation values to be stored is D' and the second FIFO memory 26 receives the frequency compensation value from the compensation value update processing unit 24, the second FIFO memory 26 stores the frequency compensation value.

However, when the second FIFO memory 26 has already stored D' frequency compensation values, upon receiving a frequency compensation value from the compensation value update processing unit 24, the second FIFO memory 26 discards the frequency compensation value stored earliest when storing the frequency compensation value.

In the reception processing unit 6 illustrated in FIG. 2, the calculation cycle T' of the frequency compensation value in the compensation value calculating unit 22 is shorter than the required extraction time E of the clock signal in the clock extraction unit 11, and a value obtained by multiplying the number D' of frequency compensation values to be stored by the calculation cycle T' is equal to or longer than the required extraction time E.

The phase compensation unit 27 is implemented by, for example, a phase compensation circuit 43 shown in FIG. 3.

The phase compensation unit 27 compensates the phase of the frequency-compensated digital detection signal output from the frequency compensation unit 21.

The phase compensation unit 27 outputs the phase-compensated digital detection signal to the signal determination unit 28.

The signal determination unit 28 is implemented by, for example, a signal determination circuit 44 illustrated in FIG. 3.

The signal determination unit 28 demodulates the phase-compensated digital detection signal output from the phase compensation unit 27.

When the light propagated through the space is modulated by, for example, the QPSK modulation system, the digital detection signal is demodulated by the QPSK demodulation system. Further, when the light propagated through the space is modulated by, for example, the modulation system of 8PSK, the digital detection signal is demodulated by the demodulation system of 8PSK.

In FIG. 2, it is assumed that each of the clock extraction unit 11, the degradation determination unit 12, the adaptive filter 14, the coefficient calculating unit 15, the coefficient update processing unit 17, the coefficient storage unit 18, the first FIFO memory 19, the frequency compensation unit 21, the compensation value calculating unit 22, the compensation value update processing unit 24, the compensation value storage unit 25, the second FIFO memory 26, the phase compensation unit 27, and the signal determination unit 28, which are components of the reception processing unit 6, is implemented by dedicated hardware as illustrated in FIG. 3. That is, it is assumed that the reception processing unit 6 is implemented by the clock extraction circuit 31, the degradation determination circuit 32, the digital filter circuit 33, the coefficient calculating circuit 34, the coefficient update processing circuit 35, the coefficient storage circuit 36, the FIFO memory circuit 37, the frequency compensation circuit 38, the compensation value calculating circuit 39, the compensation value update processing circuit 40, the compensation value storage circuit 41, the FIFO memory circuit 42, the phase compensation circuit 43, and the signal determination circuit 44.

Here, each of the coefficient storage circuit 36, the FIFO memory circuit 37, the compensation value storage circuit 41, and the FIFO memory circuit 42 is, for example, a nonvolatile or volatile semiconductor memory, such as a RAM (Random Access Memory), a ROM (Read Only Memory), a flash memory, an EPROM (Erasable Programmable Read Only Memory), and an EEPROM (Electrically Erasable Programmable Read Only Memory), a magnetic disk, a flexible disk, an optical disk, a compact disk, a mini disk, a DVD (Digital Versatile Disc), or the like.

In addition, each of the clock extraction circuit 31, the degradation determination circuit 32, the digital filter circuit 33, the coefficient calculating circuit 34, the coefficient update processing circuit 35, the frequency compensation circuit 38, the compensation value calculating circuit 39, the compensation value update processing circuit 40, the phase compensation circuit 43, and the signal determination circuit 44 corresponds to, for example, a single circuit, a composite circuit, a programmed processor, a parallel-programmed processor, an application specific integrated circuit (ASIC), a field-programmable gate array (FPGA), or a combination thereof.

The components of the reception processing unit 6 are not limited to those implemented by dedicated hardware, but the reception processing unit 6 may be implemented by software, firmware, or a combination of software and firmware.

The software or firmware is stored in a memory of a computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 4:
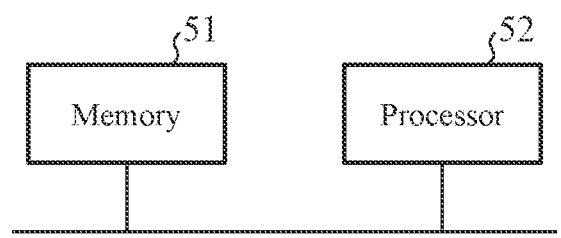

FIG. 4 is a hardware configuration diagram of a computer when the reception processing unit 6 is implemented by software, firmware, or the like.

In a case where the reception processing unit 6 is implemented by software, firmware, or the like, the coefficient storage unit 18, the first FIFO memory 19, the compensation value storage unit 25, and the second FIFO memory 26 are configured on a memory 51 of the computer. A program for causing a computer to execute processing procedures performed by the clock extraction unit 11, the degradation determination unit 12, the adaptive filter 14, the coefficient calculating unit 15, the coefficient update processing unit 17, the frequency compensation unit 21, the compensation value calculating unit 22, the compensation value update processing unit 24, the phase compensation unit 27, and the signal determination unit 28 is stored in the memory 51. Then, a processor 52 of the computer executes the program stored in the memory 51.

Furthermore, FIG. 3 illustrates an example in which each of the components of the reception processing unit 6 is implemented by dedicated hardware, and FIG. 4 illustrates an example in which the reception processing unit 6 is implemented by software, firmware, or the like. However, this is merely an example, and some components in the reception processing unit 6 may be implemented by dedicated hardware, and the remaining components may be implemented by software, firmware, or the like.

Next, the operation of the receiver illustrated in FIG. 1 will be described.

Figure 5:
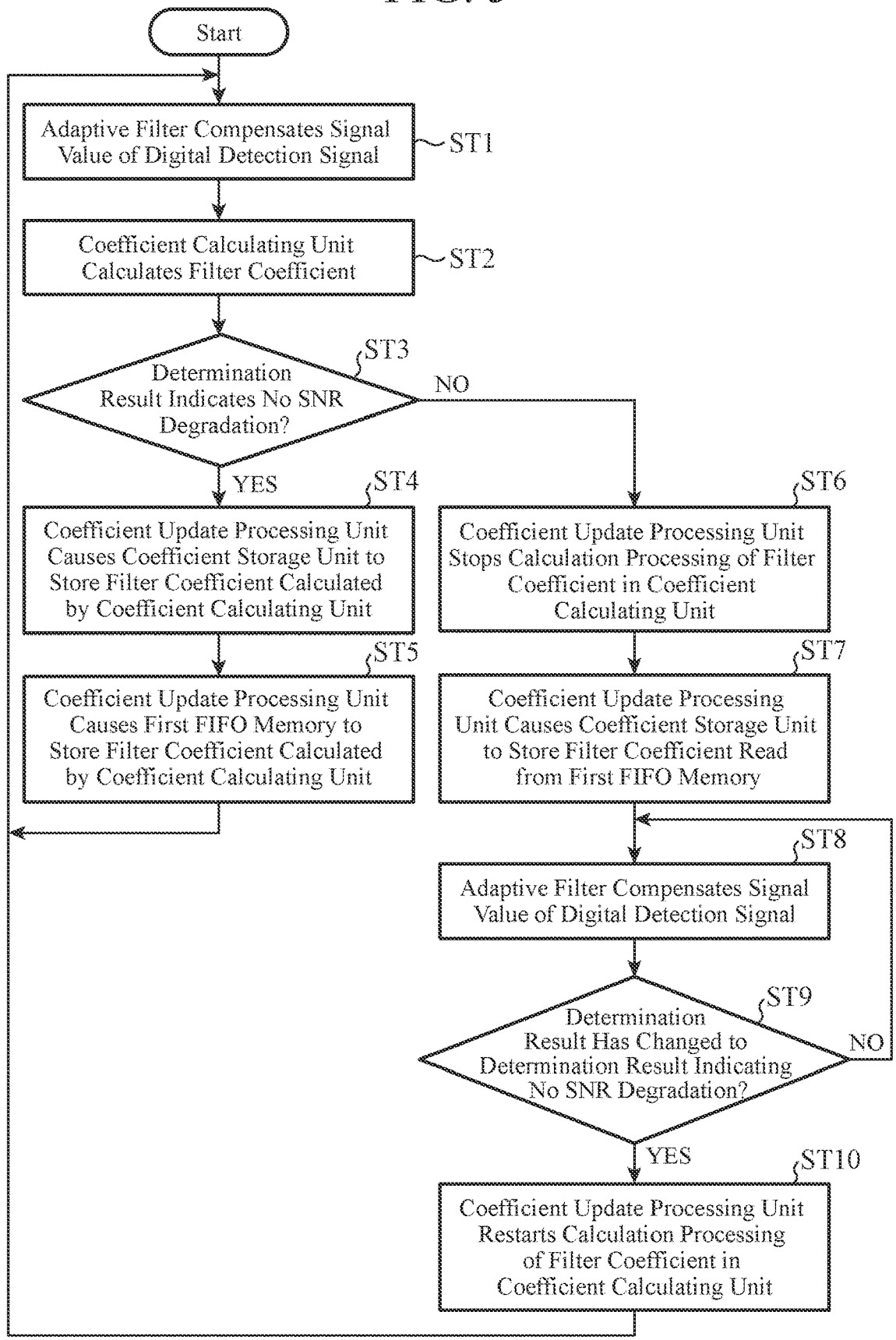
FIG. 5 is a flowchart illustrating a processing procedure performed by an equalization unit 13 in the reception processing unit 6.

FIG. 5 is a flowchart illustrating a processing procedure performed by the equalization unit 13 in the reception processing unit 6.

Figure 6:
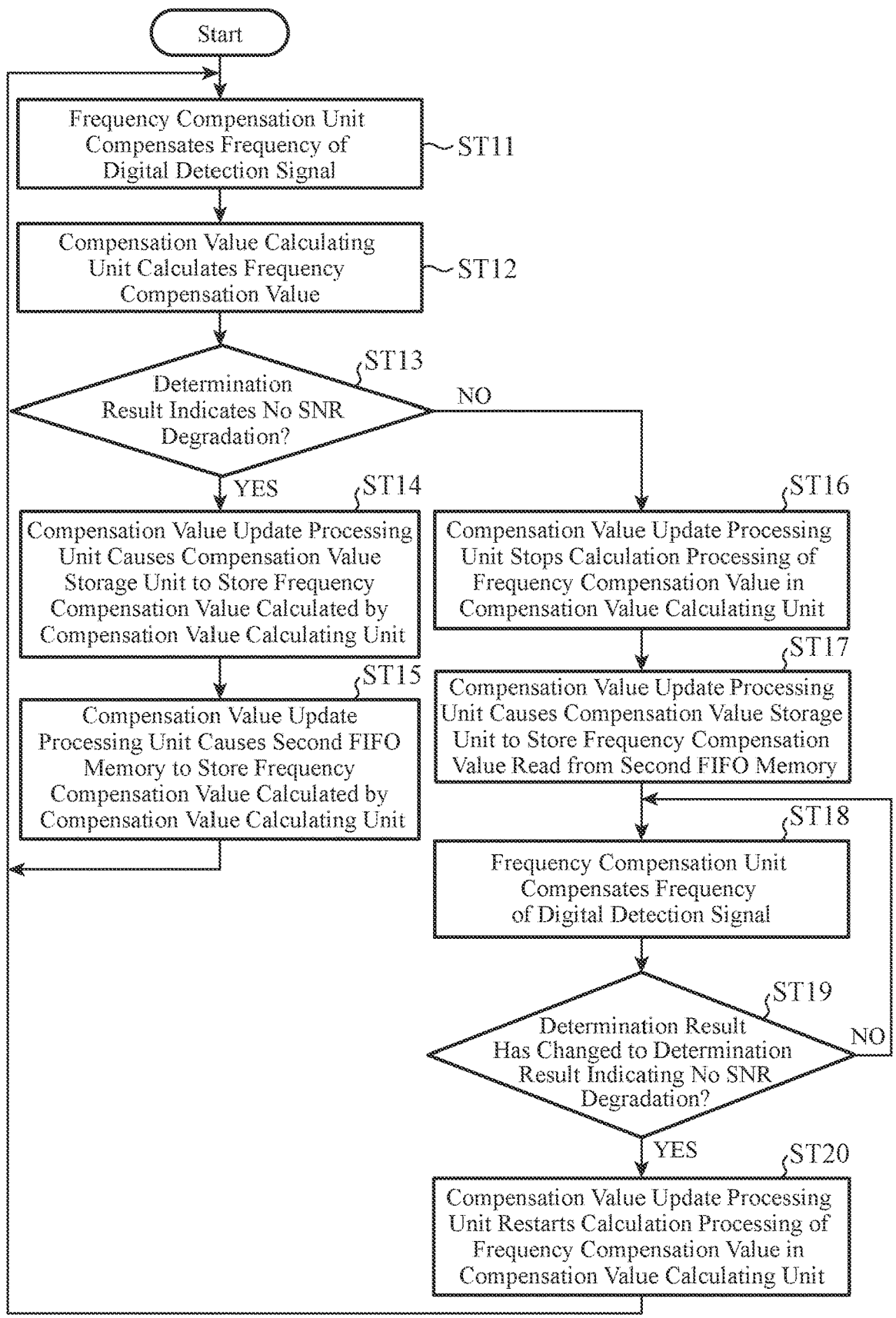
FIG. 6 is a flowchart illustrating a processing procedure performed by an equalization unit 20 in the reception processing unit 6.

FIG. 6 is a flowchart illustrating a processing procedure performed by the equalization unit 20 in the reception processing unit 6.

A transmitter (not illustrated) modulates light emitted from alight source (not illustrated) depending on information on a communication target. As a modulation system of light, for example, a modulation system of QPSK or 8PSK can be used.

The transmitter (not illustrated) emits light modulated depending on information on a communication target to space.

The optical system 1 collects light emitted from a transmitter (not illustrated) and then propagated through the space, and couples the collected light to the optical fiber 2.

The optical fiber 2 transmits the light collected by the optical system 1 to the optical amplifier 3.

The optical amplifier 3 amplifies the light so that the power of the light transmitted by the optical fiber 2 turns into a predetermined power.

The optical amplifier 3 outputs the amplified light to the coherent detector 4 via the optical fiber 2'.

Upon receiving the amplified light from the optical amplifier 3, the coherent detector 4 coherently detects the amplified light.

The coherent detector 4 outputs a detection signal of light to the ADC 5 as a coherent detection result of light.

Upon receiving the detection signal from the coherent detector 4, the ADC 5 converts the detection signal from an analog signal to a digital signal.

The ADC 5 outputs the digital detection signal, which is a digital signal, to each of the clock extraction unit 11, the adaptive filter 14, and the coefficient calculating unit 15 of the reception processing unit 6.

Upon receiving the digital detection signal from the ADC 5, the reception processing unit 6 compensates the digital detection signal and demodulates the compensated digital detection signal.

Hereinafter, compensation processing and the like of the digital detection signal by the reception processing unit 6 will be described in detail.

Upon receiving the digital detection signal from the ADC 5, the clock extraction unit 11 extracts the clock signal superimposed on the digital detection signal by using, for example, a technology called CDR.

The clock extraction unit 11 outputs the extracted clock signal to the degradation determination unit 12.

Upon receiving the clock signal from the clock extraction unit 11, the degradation determination unit 12 determines whether or not the SNR of the digital detection signal output from the ADC 5 is lower than the demodulatable SNR on the basis of the amplitude of the clock signal.

That is, the degradation determination unit 12 compares the amplitude of the clock signal extracted by the clock extraction unit 11 with a threshold, and determines that the SNR of the digital detection signal is not lower than the demodulatable SNR when the amplitude of the clock signal is equal to or greater than the threshold.

When the amplitude of the clock signal is less than the threshold, the degradation determination unit 12 determines that the SNR of the digital detection signal is lower than the demodulatable SNR.

The degradation determination unit 12 outputs a determination result, indicating whether or not the SNR of the digital detection signal is lower than the demodulatable SNR, to each of the coefficient update processing unit 17 and the compensation value update processing unit 24.

Upon receiving the digital detection signal from the ADC 5, the adaptive filter 14 compensates the signal value of the digital detection signal by using the filter coefficient stored by the coefficient storage unit 18 (step ST1 in FIG. 5).

The adaptive filter 14 outputs the digital detection signal after the signal value compensation to each of the coefficient calculating unit 15, the frequency compensation unit 21, and the compensation value calculating unit 22.

The adaptive filter 14 compensates the signal value of the digital detection signal, so that the signal value of the digital detection signal can be brought close to the reference value, for example, even if the time variation in the phase of the clock signal superimposed on the digital detection signal or the time variation in the frequency characteristic of the digital detection signal occurs.

When the filter coefficient stored in the coefficient storage unit 18 is an appropriate coefficient, the signal value of the digital detection signal output from the adaptive filter 14 substantially matches the reference value.

It is assumed that the signal value of the digital detection signal is modulated to be any value of 0, 1, 2, 3, 4, and 5, for example, and the filter coefficient stored by the coefficient storage unit 18 is an appropriate coefficient. At this time, when the signal value of the digital detection signal output from the ADC 5 is, for example, "2.8", the signal value of the digital detection signal output from the adaptive filter 14 is approximately "3". Further, when the signal value of the digital detection signal output from the ADC 5 is, for example, "4.3", the signal value of the digital detection signal output from the adaptive filter 14 is approximately "4".

Upon receiving the digital detection signal from the ADC 5, the coefficient calculating unit 15 acquires a reference value corresponding to the signal value of the digital detection signal from among the reference values stored in the internal memory. In a case where the signal value of the digital detection signal is modulated to any value of, for example, 0, 1, 2, 3, 4, and 5, the coefficient calculating unit 15 acquires "3" as a reference value when the signal value of the digital detection signal is, for example, "2.7", and acquires "1" as a reference value when the signal value of the digital detection signal is, for example, "1.3".

Furthermore, the coefficient calculating unit 15 acquires the filter coefficient stored by the coefficient storage unit 18.

The coefficient calculating unit 15 newly calculates the filter coefficient in which the signal value of the detection signal output from the adaptive filter 14 is the acquired reference value by using the filter coefficient stored by the coefficient storage unit 18 (step ST2 in FIG. 5).

The coefficient calculating unit 15 outputs the calculated filter coefficient to the coefficient update processing unit 17.

In the reception processing unit 6 illustrated in FIG. 2, the calculation cycle T of the filter coefficient in the coefficient calculating unit 15 is shorter than the required extraction time E of the clock signal in the clock extraction unit 11.

For example, when the calculation cycle T of the filter coefficient in the coefficient calculating unit 15 is 1/N of the required extraction time E of the clock signal in the clock extraction unit 11, the coefficient calculating unit 15 calculates the filter coefficient N times while the clock extraction unit 11 extracts the clock signal once. N is an integer equal to or more than two.

The coefficient update processing unit 17 acquires the determination result output from the degradation determination unit 12.

If the determination result indicates no degradation (step ST3 in FIG. 5: YES), the coefficient update processing unit 17 causes the coefficient storage unit 18 to store the filter coefficient calculated by the coefficient calculating unit 15 (step ST4 in FIG. 5).

The coefficient update processing unit 17 causes the coefficient storage unit 18 to store the filter coefficient calculated by the coefficient calculating unit 15, so that the filter coefficient used by the adaptive filter 14 for signal value compensation is changed to the filter coefficient calculated by the coefficient calculating unit 15.

If the determination result indicates no degradation, the coefficient update processing unit 17 causes the first FIFO memory 19 to store the filter coefficient calculated by the coefficient calculating unit 15 (step ST5 in FIG. 5).

The first FIFO memory 19 stores the filter coefficient output from the coefficient update processing unit 17. However, when the first FIFO memory 19 has already stored the D filter coefficients, upon receiving a filter coefficient from the coefficient update processing unit 17, the first FIFO memory 19 discards the filter coefficient stored earliest when storing the filter coefficient.

Upon receiving a new digital detection signal from the ADC 5, the adaptive filter 14 compensates the signal value of the digital detection signal by using the filter coefficient stored in the coefficient storage unit 18 (step ST1 in FIG. 5).

The adaptive filter 14 outputs the digital detection signal after the signal value compensation to each of the coefficient calculating unit 15, the frequency compensation unit 21, and the compensation value calculating unit 22.

If the determination result output from the degradation determination unit 12 indicates a degradation (step ST3 in FIG. 5: NO), the coefficient update processing unit 17 stops the calculation processing of filter coefficient in the coefficient calculating unit 15 (step ST6 in FIG. 5).

In addition, if the determination result indicates a degradation, the coefficient update processing unit 17 reads the filter coefficient stored earliest among the filter coefficients stored in the first FIFO memory 19.

The coefficient update processing unit 17 causes the coefficient storage unit 18 to store the readout filter coefficient (step ST7 in FIG. 5).

The coefficient update processing unit 17 causes the coefficient storage unit 18 to store the readout filter coefficient, so that the filter coefficient used by the adaptive filter 14 for signal value compensation is changed to the readout filter coefficient.

The calculation cycle T of the filter coefficient in the coefficient calculating unit 15 is shorter than the required extraction time E of the clock signal in the clock extraction unit 11, and a value obtained by multiplying the number D of filter coefficients to be stored by the calculation cycle T is equal to or longer than the required extraction time E. Thus, if the first FIFO memory 19 stores, for example, D filter coefficients, the readout filter coefficient is the filter coefficient calculated by the coefficient calculating unit 15 at a time D×T before the current time. Note that the readout filter coefficient is a filter coefficient calculated by the coefficient calculating unit 15 when the SNR of the digital detection signal is not lower than the demodulatable SNR.

Upon receiving anew digital detection signal from the ADC 5, the adaptive filter 14 compensates the signal value of the digital detection signal by using the filter coefficient stored in the coefficient storage unit 18 (step ST8 in FIG. 5).

The adaptive filter 14 outputs the digital detection signal after the signal value compensation to each of the coefficient calculating unit 15, the frequency compensation unit 21, and the compensation value calculating unit 22.

When the determination result output from the degradation determination unit 12 changes from a determination result indicating a degradation to a determination result indicating no degradation (step ST9 in FIG. 5: YES), the coefficient update processing unit 17 restarts the calculation processing of filter coefficient in the coefficient calculating unit 15 (step ST10 in FIG. 5).

If the determination result output from the degradation determination unit 12 does not change from the determination result indicating a degradation to the determination result indicating no degradation (step ST9 in FIG. 5: NO), the adaptive filter 14 compensates the signal value of the digital detection signal by using the filter coefficient stored in the coefficient storage unit 18 (step ST8 in FIG. 5).

Thereafter, the equalization unit 13 repeatedly performs the processing of steps ST1 to ST 10 in FIG. 5.

Upon receiving the digital detection signal from the adaptive filter 14, the frequency compensation unit 21 uses the frequency compensation value stored in the compensation value storage unit 25 to compensate the frequency of the digital detection signal by phase-rotating the digital detection signal (step ST11 in FIG. 6).

Since the frequency compensation processing itself by the frequency compensation unit 21 is a known technique, detailed description thereof will be omitted.

The frequency compensation unit 21 outputs the detection signal after the frequency compensation to each of the compensation value calculating unit 22 and the phase compensation unit 27.

Since the frequency compensation unit 21 compensates the frequency of the digital detection signal, for example, even if the frequency of the amplified light output from the optical amplifier 3 and the frequency of the light to be interfered are slightly different, it is possible to eliminate the deviation between the frequency of the digital detection signal and the frequency of the baseband signal.

The compensation value calculating unit 22 calculates a new frequency compensation value from the digital detection signal output from the adaptive filter 14, the frequency compensated digital detection signal output from the frequency compensation unit 21, and the frequency compensation value stored in the compensation value storage unit 25, as the frequency compensation value used for phase rotation of the digital detection signal by the frequency compensation unit 21 (step ST12 in FIG. 6).

The compensation value calculating unit 22 outputs the calculated frequency compensation value to the compensation value update processing unit 24 of the compensation value update unit 23.

In the reception processing unit 6 illustrated in FIG. 2, the calculation cycle T' of the frequency compensation value in the compensation value calculating unit 22 is shorter than the required extraction time E of the clock signal in the clock extraction unit 11.

For example, when the calculation cycle T' of the frequency compensation value in the compensation value calculating unit 22 is 1/N' of the required extraction time E of the clock signal in the clock extraction unit 11, the compensation value calculating unit 22 calculates the filter coefficient N' times while the clock extraction unit 11 extracts the clock signal once. N' is an integer equal to or more than two.

The compensation value update processing unit 24 acquires the determination result output from the degradation determination unit 12.

If the determination result indicates no degradation (step ST13 in FIG. 6: YES), the compensation value update processing unit 24 causes the compensation value storage unit 25 to store the frequency compensation value calculated by the compensation value calculating unit 22 (step ST14 in FIG. 6).

The compensation value update processing unit 24 causes the compensation value storage unit 25 to store the frequency compensation value calculated by the compensation value calculating unit 22, whereby the frequency compensation unit 21 changes the frequency compensation value used for phase rotation of the digital detection signal to the frequency compensation value calculated by the compensation value calculating unit 22.

In addition, if the determination result indicates no degradation, the compensation value update processing unit 24 causes the second FIFO memory 26 to store the frequency compensation value calculated by the compensation value calculating unit 22 (step ST15 in FIG. 6).

The second FIFO memory 26 stores the frequency compensation value output from the compensation value update processing unit 24. However, when the second FIFO memory 26 has already stored D' frequency compensation values, upon receiving a frequency compensation value from the compensation value update processing unit 24, the second FIFO memory 26 discards the frequency compensation value stored earliest when storing the frequency compensation value.

Upon receiving a new digital detection signal from the adaptive filter 14, the frequency compensation unit 21 uses the frequency compensation value stored in the compensation value storage unit 25 to compensate the frequency of the digital detection signal by phase-rotating the digital detection signal (step ST11 in FIG. 6).

The frequency compensation unit 21 outputs the detection signal after the frequency compensation to each of the compensation value calculating unit 22 and the phase compensation unit 27.

If the determination result indicates a degradation (step ST13 in FIG. 6: NO), the compensation value update processing unit 24 stops the frequency compensation value calculation processing in the compensation value calculating unit 22 (step ST16 in FIG. 6).

If the determination result indicates a degradation, the compensation value update processing unit 24 reads the frequency compensation value stored earliest among the frequency compensation values stored in the second FIFO memory 26.

The compensation value update processing unit 24 causes the compensation value storage unit 25 to store the read frequency compensation value (step ST17 in FIG. 6).

The compensation value update processing unit 24 causes the compensation value storage unit 25 to store the read frequency compensation value, whereby the frequency compensation unit 21 changes the frequency compensation value used for phase rotation of the digital detection signal to the read frequency compensation value.

The calculation cycle T' of the frequency compensation value in the compensation value calculating unit 22 is shorter than the required extraction time E of the clock signal in the clock extraction unit 11, and a value obtained by multiplying the number D' of the frequency compensation values to be stored by the calculation cycle T' is equal to or longer than the required extraction time E. Thus, if the second FIFO memory 26 stores, for example, D' frequency compensation values, the read frequency compensation value is a frequency compensation value calculated by the compensation value calculating unit 22 at a time D'×T' before the current time. Note that, the read frequency compensation value is a frequency compensation value calculated by the compensation value calculating unit 22 when the SNR of the digital detection signal is not lower than the demodulatable SNR Upon receiving a new digital detection signal from the adaptive filter 14, the frequency compensation unit 21 uses the frequency compensation value stored in the compensation value storage unit 25 to compensate the frequency of the digital detection signal by phase-rotating the digital detection signal (step ST18 in FIG. 6).

The frequency compensation unit 21 outputs the detection signal after the frequency compensation to each of the compensation value calculating unit 22 and the phase compensation unit 27.

When the determination result output from the degradation determination unit 12 changes from a determination result indicating a degradation to a determination result indicating no degradation (step ST19 in FIG. 6: YES), the compensation value update processing unit 24 restarts the frequency compensation value calculation processing in the compensation value calculating unit 22 (step ST20 in FIG. 6).

If the determination result output from the degradation determination unit 12 does not change from the determination result indicating a degradation to the determination result indicating no degradation (step ST19 in FIG. 6: NO), the frequency compensation unit 21 uses the frequency compensation value stored in the compensation value storage unit 25 to compensate the frequency of the digital detection signal by phase-rotating the digital detection signal output from the adaptive filter 14 (step ST18 in FIG. 6).

Thereafter, the equalization unit 20 repeatedly performs the processing of steps ST 11 to ST 20 in FIG. 6.

Upon receiving the frequency-compensated digital detection signal output from the frequency compensation unit 21, the phase compensation unit 27 compensates the phase of the digital detection signal.

Since the phase compensation processing itself of the digital detection signal by the phase compensation unit 27 is a known technique, detailed description thereof will be omitted.

The phase compensation unit 27 outputs the phase-compensated digital detection signal to the signal determination unit 28.

Upon receiving the phase-compensated digital detection signal from the phase compensation unit 27, the signal determination unit 28 demodulates the phase-compensated digital detection signal.

Since the demodulation processing itself of the digital detection signal by the signal determination unit 28 is a known technique, detailed description thereof will be omitted.

The signal determination unit 28 outputs the demodulation result of the digital detection signal to the outside.

In the first embodiment described above, the receiver is configured to include the clock extraction unit 11 to extract the clock signal superimposed on the detection signal of the light propagated through the space, the degradation determination unit 12 to determine whether or not the SNR of the detection signal is lower than the SNR at which the detection signal can be demodulated on the basis of the amplitude of the clock signal extracted by the clock extraction unit 11, the adaptive filter 14 to compensate the signal value of the detection signal using the filter coefficient and output the detection signal after the signal value compensation, and the coefficient calculating unit 15 to calculate, as the filter coefficient, the filter coefficient in which the signal value of the detection signal output from the adaptive filter 14 is the reference value, in which the coefficient update unit 16 stores the filter coefficient calculated by the coefficient calculating unit 15 when the degradation determination unit 12 determines that there is no SNR degradation, and changes the filter coefficient used by the adaptive filter 14 to the stored filter coefficient when the degradation determination unit 12 determines that SNR degradation occurs. Thus, when the SNR of the detection signal changes from less than the SNR at which the detection signal can be demodulated to equal to or more than the SNR at which the detection signal can be demodulated, the receiver can improve the bit error rate without newly calculating the filter coefficient used by the adaptive filter 14 and performing the process of updating the filter coefficient used by the adaptive filter 14.

Further, in the first embodiment, the receiver is configured to include the frequency compensation unit 21 to compensate the frequency of the detection signal output from the adaptive filter 14 by phase-rotating the detection signal output from the adaptive filter 14 using the frequency compensation value, and outputs the detection signal after the frequency compensation, and the compensation value calculating unit 22 to calculate the frequency of the detection signal output from the adaptive filter 14 as the frequency compensation value, in which the compensation value update unit 23 stores the frequency compensation value calculated by the compensation value calculating unit 22 when the degradation determination unit 12 determines that there is no SNR degradation, and causes the frequency compensation unit 21 to change the frequency compensation value used for the phase rotation of the detection signal to the stored frequency compensation value when the degradation determination unit 12 determines that SNR degradation occurs. Therefore, when the SNR of the detection signal changes from less than the SNR at which the detection signal can be demodulated to equal to or more than the SNR at which the detection signal can be demodulated, the receiver can improve the bit error rate without newly calculating the frequency compensation value used for the phase rotation of the detection signal output from the adaptive filter 14 and performing the process of updating the frequency compensation value used for the phase rotation of the digital detection signal by the frequency compensation unit 21.

The receiver illustrated in FIG. 2 includes both the equalization unit 13 and the equalization unit 20. However, this is merely an example, and the receiver may include any one of the equalization unit 13 and the equalization unit 20.

Second Embodiment

In a second embodiment, a receiver including an abnormality determination unit 61 to determine a type of abnormality in optical communication will be described.

Figure 7:
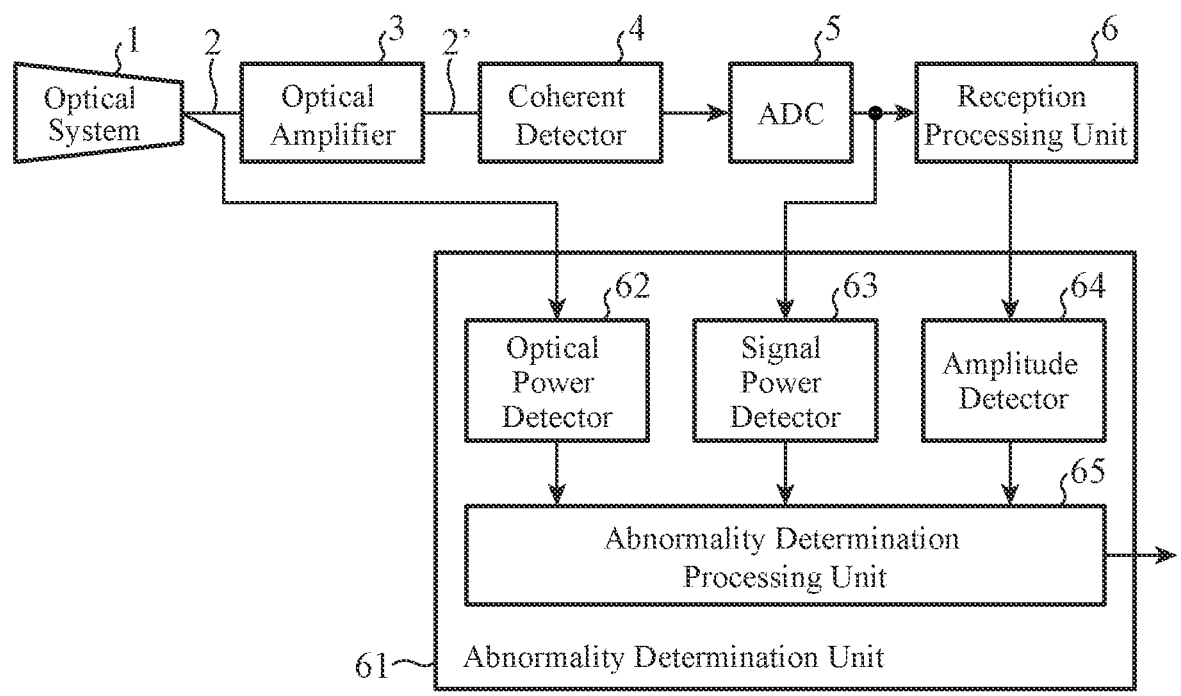
FIG. 7 is a configuration diagram illustrating a receiver according to a second embodiment.

FIG. 7 is a configuration diagram illustrating a receiver according to the second embodiment.

Figure 8:
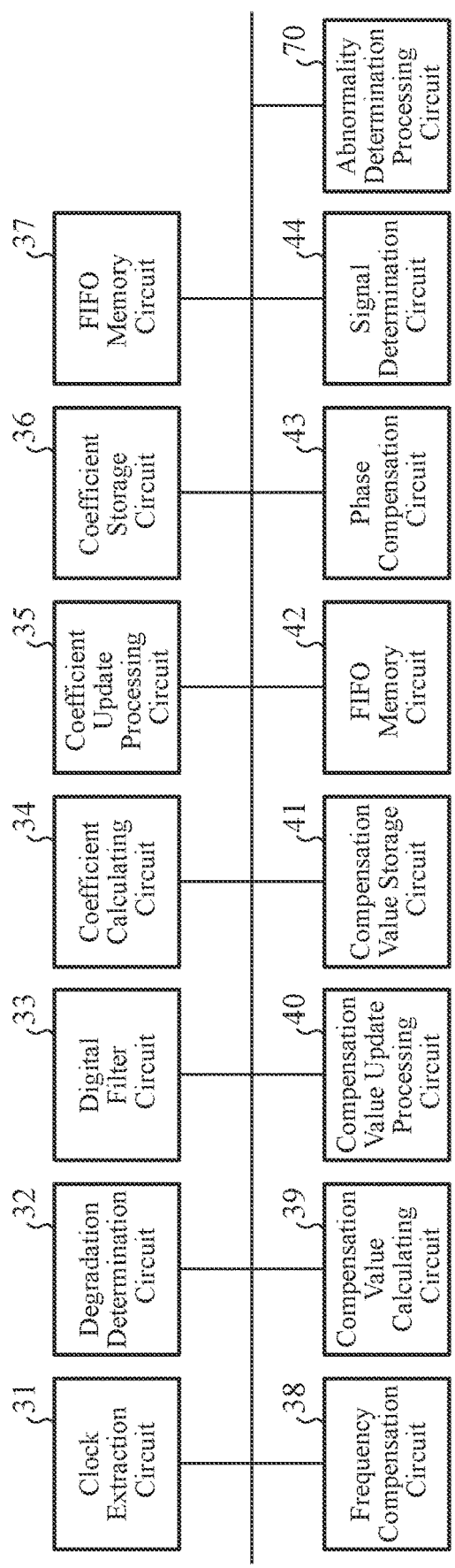
FIG. 8 is a hardware configuration diagram illustrating hardware of a reception processing unit 6 and a part of hardware of an abnormality determination unit 61 in the receiver according to the second embodiment.

FIG. 8 is a hardware configuration diagram illustrating part of hardware of the reception processing unit 6 and hardware of the abnormality determination unit 61 in the receiver according to the second embodiment.

In FIGS. 7 and 8, the same reference numerals as those in FIGS. 1 and 3 denote the same or corresponding parts, and thus detailed description thereof is omitted.

The abnormality determination unit 61 includes an optical power detector 62, a signal power detector 63, an amplitude detector 64, and an abnormality determination processing unit 65.

The abnormality determination unit 61 determines a type of abnormality in optical communication from the power of light propagated through the space, the power of the digital detection signal output from the ADC 5, and the amplitude of the clock signal extracted by the clock extraction unit 11 of the reception processing unit 6.

The optical power detector 62 detects the power of light propagated through the space and then collected by the optical system 1, and outputs a first digital signal indicating the power of the light to the abnormality determination processing unit 65.

The signal power detector 63 detects the power of the digital detection signal output from the ADC 5, and outputs a second digital signal indicating the power of the digital detection signal to the abnormality determination processing unit 65.

The amplitude detector 64 detects the amplitude of the clock signal extracted by the clock extraction unit 11, and outputs a third digital signal indicating the amplitude of the clock signal to the abnormality determination processing unit 65.

The abnormality determination processing unit 65 is implemented by, for example, an abnormality determination processing circuit 70 illustrated in FIG. 8.

The abnormality determination processing unit 65 determines a type of abnormality in optical communication from the first digital signal output from the optical power detector 62, the second digital signal output from the signal power detector 63, and the third digital signal output from the amplitude detector 64.

In FIG. 7, it is assumed that each of the clock extraction unit 11, the degradation determination unit 12, the adaptive filter 14, the coefficient calculating unit 15, the coefficient update processing unit 17, the coefficient storage unit 18, the first FIFO memory 19, the frequency compensation unit 21, the compensation value calculating unit 22, the compensation value update processing unit 24, the compensation value storage unit 25, the second FIFO memory 26, the phase compensation unit 27, and the signal determination unit 28, which are components of the reception processing unit 6, and the abnormality determination processing unit 65, which is a part of the components of the abnormality determination unit 61, are implemented by dedicated hardware as illustrated in FIG. 8. That is, it is assumed that the reception processing unit 6 is implemented by the clock extraction circuit 31, the degradation determination circuit 32, the digital filter circuit 33, the coefficient calculating circuit 34, the coefficient update processing circuit 35, the coefficient storage circuit 36, the FIFO memory circuit 37, the frequency compensation circuit 38, the compensation value calculating circuit 39, the compensation value update processing circuit 40, the compensation value storage circuit 41, the FIFO memory circuit 42, the phase compensation circuit 43, and the signal determination circuit 44, and a part of the abnormality determination unit 61 is implemented by the abnormality determination processing circuit 70.

Here, the abnormality determination processing circuit 70 corresponds to, for example, a single circuit, a composite circuit, a programmed processor, a parallel programmed processor, ASIC, FPGA, or a combination thereof.

The components of the reception processing unit 6 and a part of the abnormality determination unit 61 are not limited to those implemented by dedicated hardware, but the reception processing unit 6 and a part of the abnormality determination unit 61 may be implemented by software, firmware, or a combination of software and firmware.

In a case where the reception processing unit 6 and a part of the abnormality determination unit 61 are implemented by software, firmware, or the like, the coefficient storage unit 18, the first FIFO memory 19, the compensation value storage unit 25, and the second FIFO memory 26 are configured on the memory 51 of the computer illustrated in FIG. 4. A program for causing a computer to execute processing procedures performed by the clock extraction unit 11, the degradation determination unit 12, the adaptive filter 14, the coefficient calculating unit 15, the coefficient update processing unit 17, the frequency compensation unit 21, the compensation value calculating unit 22, the compensation value update processing unit 24, the phase compensation unit 27, the signal determination unit 28, and the abnormality determination processing unit 65 is stored in the memory 51 illustrated in FIG. 4. Then, the processor 52 illustrated in FIG. 4 executes the program stored in the memory 51.

Next, the operation of the receiver illustrated in FIG. 7 will be described.

Since the receiver is similar to the receiver illustrated in FIG. 1 except for the abnormality determination unit 61, only the operation of the abnormality determination unit 61 will be described here.

FIG. 9 is an explanatory diagram illustrating an example of a determination result of the abnormality determination unit 61.

The optical power detector 62 of the abnormality determination unit 61 monitors the light collected by the optical system 1 and detects the power of the light.

The optical power detector 62 outputs a first digital signal indicating the detected power of the light to the abnormality determination processing unit 65.

The signal power detector 63 monitors the digital detection signal output from the ADC 5 and detects the power of the digital detection signal.

The signal power detector 63 outputs a second digital signal indicating the detected power of the digital detection signal to the abnormality determination processing unit 65.

The amplitude detector 64 monitors the clock signal extracted by the clock extraction unit 11 and detects the amplitude of the clock signal.

The amplitude detector 64 outputs a third digital signal indicating the detected amplitude of the clock signal to the abnormality determination processing unit 65.

The abnormality determination processing unit 65 acquires the first digital signal output from the optical power detector 62, the second digital signal output from the signal power detector 63, and the third digital signal output from the amplitude detector 64.

The internal memory of the abnormality determination processing unit 65 stores a first threshold related to the first digital signal, a second threshold related to the second digital signal, and a third threshold related to the third digital signal.

Here, the internal memory of the abnormality determination processing unit 65 stores the first threshold, the second threshold, and the third threshold. However, this is merely an example, and the first threshold, the second threshold, and the third threshold may be given from the outside of the receiver.

The abnormality determination processing unit 65 compares the first digital signal with the first threshold, and determines that the power of the light collected by the optical system 1 is high when the first digital signal is equal to or more than the first threshold.

When the first digital signal is less than the first threshold, the abnormality determination processing unit 65 determines that the power of the light collected by the optical system 1 is low.

The abnormality determination processing unit 65 compares the second digital signal with the second threshold, and determines that the power of the digital detection signal is high when the second digital signal is equal to or more than the second threshold.

When the second digital signal is less than the second threshold, the abnormality determination processing unit 65 determines that the power of the digital detection signal is low.

The abnormality determination processing unit 65 compares the third digital signal with the third threshold, and determines that the amplitude of the clock signal is high when the third digital signal is equal to or more than the third threshold.

When the third digital signal is less than the third threshold, the abnormality determination processing unit 65 determines that the amplitude of the clock signal is low.

The abnormality determination processing unit 65 determines that the optical communication is normally performed as illustrated in FIG. 9 when the power of the light is high, the power of the digital detection signal is high, and the amplitude of the clock signal is high.

When the power of the light is high, the power of the digital detection signal is high, and the amplitude of the clock signal is low, the abnormality determination processing unit 65 determines that a modulation abnormality of the light in the transmitter (not illustrated) occurs as illustrated in FIG. 9. It is conceivable that since the modulation abnormality of the light occurs, the clock extraction unit 11 cannot sufficiently extract the clock signal, and the amplitude of the clock signal is low.

When the power of the light is high, the power of the digital detection signal is low, and the amplitude of the clock signal is low, as illustrated in FIG. 9, the abnormality determination processing unit 65 determines that the abnormality of the wavelength deviation in which the wavelength of the light collected by the optical system 1 deviates from the wavelength of the light oscillated by the light source of the transmitter (not illustrated) occurs. It is conceivable that since the abnormality of the wavelength deviation occurs, the coherent detector 4 cannot perform the coherent detection of the light output from the optical amplifier 3 normally, and each of the power of the digital detection signal and the amplitude of the clock signal is low.

When the power of the light is low, the power of the digital detection signal is high, and the amplitude of the clock signal is low, the abnormality determination processing unit 65 determines that the power of the light collected by the optical system 1 is low due to the influence of the atmosphere, for example, as illustrated in FIG. 9.

The abnormality determination processing unit 65 outputs a determination result of the type of abnormality in optical communication to the outside.

In the second embodiment described above, the receiver illustrated in FIG. 7 is configured to include the abnormality determination unit 61 to determine the type of abnormality in optical communication from the power of the light propagated through the space, the power of the detection signal of the light, and the amplitude of the clock signal extracted by the clock extraction unit 11. Therefore, similarly to the receiver illustrated in FIG. 1, the receiver illustrated in FIG. 7 can improve the bit error rate and notify the determination result of the type of abnormality in optical communication.

It should be noted that the invention of the present application can freely combine the embodiments, modify any constituent element of each embodiment, or omit any constituent element in each embodiment within the scope of the invention.

INDUSTRIAL APPLICABILITY

The present invention is suitable for a receiver that compensates for a detection signal of light propagated through space.

REFERENCE SIGNS LIST

1: optical system, 2, 2': optical fiber, 3: optical amplifier, 4: coherent detector, 5: ADC, 6: reception processing unit, 11: clock extraction unit, 12: degradation determination unit, 13: equalization unit, 14: adaptive filter, 15: coefficient calculating unit, 16: coefficient update unit, 17: coefficient update processing unit, 18: coefficient storage unit, 19: first FIFO memory, 20: equalization unit, 21: frequency compensation unit, 22: compensation value calculating unit, 23: compensation value update unit, 24: compensation value update processing unit, 25: compensation value storage unit, 26: second FIFO memory, 27: phase compensation unit, 28: signal determination unit, 31: clock extraction circuit, 32: degradation determination circuit, 33: digital filter circuit, 34: coefficient calculating circuit. 35: coefficient update processing circuit, 36: coefficient storage circuit, 37: FIFO memory circuit, 38: frequency compensation circuit, 39: compensation value calculating circuit, 40: compensation value update processing circuit, 41: compensation value storage circuit, 42: FIFO memory circuit, 43: phase compensation circuit, 44: signal determination circuit, 51: memory, 52: processor, 61: abnormality determination unit, 62: optical power detector, 63: signal power detector, 64: amplitude detector, 65: abnormality determination processing unit, 70: abnormality determination processing circuit

The invention claimed is:

1. A receiver comprising:
processing circuitry configured to
extract a clock signal superimposed on a detection signal of light propagated through space;
determine whether or not a signal-to-noise ratio of the detection signal is lower than a signal-to-noise ratio at which the detection signal is demodulated on a basis of an amplitude of the extracted clock signal;
an adaptive filter to compensate a signal value of the detection signal by using a filter coefficient and output a detection signal after signal value compensation;
calculate, as the filter coefficient, a filter coefficient in which a signal value of the detection signal output from the adaptive filter is a reference value; and
store the calculated filter coefficient when the processing circuitry determines that there is no signal-to-noise ratio degradation, and change the filter coefficient used by the adaptive filter to a stored filter coefficient when the processing circuitry determines that signal-to-noise ratio degradation occurs.

2. The receiver according to claim 1, wherein the processing circuitry changes the filter coefficient used by the adaptive filter to the calculated filter coefficient when the processing circuitry determines that there is no signal-to-noise ratio degradation.

3. The receiver according to claim 1,
wherein the processing circuitry is further configured to compensate a frequency of a detection signal output from the adaptive filter by phase-rotating the detection signal output from the adaptive filter using a frequency compensation value, and output a detection signal after frequency compensation;
calculate a frequency of the detection signal output from the adaptive filter as the frequency compensation value; and
store the calculated frequency compensation value when the processing circuitry determines that there is no signal-to-noise ratio degradation, and
change the frequency compensation value used for phase rotation of the detection signal to a stored frequency compensation value when the processing circuitry determines that signal-to-noise ratio degradation occurs.

4. The receiver according to claim 3, wherein the processing circuitry is further configured to change the frequency compensation value used for phase rotation of the detection signal to the calculated frequency compensation value when the processing circuitry determines that there is no signal-to-noise ratio degradation.

5. The receiver according to claim 3, wherein
a calculation cycle of the frequency compensation value is shorter than a required extraction time of the clock signal, and
the receiver includes, as a storage medium to store the calculated frequency compensation value, a second first-in first-out memory having a storable number in which a value obtained by multiplying the number of frequency compensation values to be stored by the calculation cycle is equal to or longer than the required extraction time.

6. The receiver according to claim 1, wherein
a calculation cycle of the filter coefficient is shorter than a required extraction time of the clock signal, and
the receiver includes, as a storage medium to store the calculated filter coefficient, a first first-in first-out memory having a storable number in which a value obtained by multiplying the number of the filter coefficients to be stored by the calculation cycle is equal to or longer than the required extraction time.

7. The receiver according to claim 1,
wherein the processing circuitry is further configured to determine a type of abnormality in optical communication from power of light propagated through the space, power of a detection signal of the light, and an amplitude of the extracted clock signal.

8. A receiver comprising:
processing circuitry configured to
extract a clock signal superimposed on a detection signal of light propagated through space;
determine whether or not a signal-to-noise ratio of the detection signal is lower than a signal-to-noise ratio at which the detection signal is demodulated on a basis of an amplitude of the extracted clock signal;
compensate a frequency of the detection signal by phase-rotating the detection signal using a frequency compensation value, and output a detection signal after frequency compensation;
calculate a frequency of the detection signal as the frequency compensation value; and
store the calculated frequency compensation value when the processing circuitry determines that there is no signal-to-noise ratio degradation, and change the frequency compensation value used for phase rotation of the detection signal to a stored frequency compensation value when the processing circuitry determines that signal-to-noise ratio degradation occurs.

9. The receiver according to claim 8, wherein the processing circuitry is configured to change the frequency compensation value used for phase rotation of the detection signal to the calculated frequency compensation value when the processing circuitry determines that there is no signal-to-noise ratio degradation.

10. The receiver according to claim 8,
wherein the processing circuitry is further configured to
compensate a signal value of the detection signal of light propagated through space by using a filter coefficient and output a detection signal after signal value compensation;
calculate, as the filter coefficient, a filter coefficient in which a signal value of the detection signal output from the adaptive filter is a reference value; and
store the calculated filter coefficient when the processing circuitry determines that there is no signal-to-noise ratio degradation, and change the filter coefficient used by the adaptive filter to a stored filter coefficient when the processing circuitry determines that signal-to-noise ratio degradation occurs.

11. The receiver according to claim 10, wherein the processing circuitry is configured to change the filter coefficient used by the adaptive filter to the calculated filter coefficient when the processing circuitry determines that there is no signal-to-noise ratio degradation.

12. The receiver according to claim 10, wherein
a calculation cycle of the filter coefficient is shorter than a required extraction time of the clock signal, and
the receiver includes, as a storage medium to store the calculated filter coefficient, a first first-in first-out memory having a storable number in which a value obtained by multiplying the number of the filter coefficients to be stored by the calculation cycle is equal to or longer than the required extraction time.

13. The receiver according to claim 8, wherein
a calculation cycle of the frequency compensation value is shorter than a required extraction time of the clock signal, and
the receiver includes, as a storage medium to store the calculated frequency compensation value, a second first-in first-out memory having a storable number in which a value obtained by multiplying the number of the frequency compensation values to be stored by the calculation cycle is equal to or longer than the required extraction time.

14. The receiver according to claim 8,
wherein the processing circuitry is further configured to determine a type of abnormality in optical communication from power of light propagated through the space, power of a detection signal of the light, and an amplitude of the extracted clock signal.

* * * * *